United States Patent [19]

Jensen

[11] Patent Number: 5,146,406
[45] Date of Patent: Sep. 8, 1992

[54] COMPUTER METHOD FOR IDENTIFYING PREDICATE-ARGUMENT STRUCTURES IN NATURAL LANGUAGE TEXT

[75] Inventor: Karen Jensen, Rockville, Md.
[73] Assignee: International Business Machines Corporation, Armonk, N.Y.
[21] Appl. No.: 395,118
[22] Filed: Aug. 16, 1989
[51] Int. Cl.[5] .............................................. G06F 15/38
[52] U.S. Cl. ..................................................... 364/419
[58] Field of Search ................ 364/419, 900 MS File, 364/200 MS File

[56] References Cited

U.S. PATENT DOCUMENTS

| | | | |
|---|---|---|---|
| 4,328,562 | 5/1982 | Hashimoto et al. | 364/900 |
| 4,420,816 | 12/1983 | Yoshida | 364/900 |
| 4,420,817 | 12/1983 | Yoshida | 364/900 |
| 4,439,836 | 3/1984 | Yoshida | 364/900 |
| 4,594,686 | 6/1986 | Yoshida | 364/900 |
| 4,635,199 | 1/1987 | Muraki | 364/419 |
| 4,641,264 | 2/1987 | Nitta et al. | 364/900 |
| 4,661,924 | 4/1987 | Okamoto et al. | 364/900 |
| 4,821,230 | 4/1989 | Kumano et al. | 364/419 |
| 4,862,408 | 8/1989 | Zamora | 364/419 |
| 4,887,212 | 12/1989 | Zamora et al. | 364/419 |
| 4,942,526 | 7/1990 | Okajima et al. | 364/419 |
| 4,964,044 | 10/1990 | Kumano et al. | 364/900 |
| 5,023,786 | 6/1991 | Kugimiya et al. | 364/419 |

OTHER PUBLICATIONS

G. E. Heidorn, et al., "The Epistle Text-Critiquing System", *IEEESystems Journal*, vol. 21, #3, 1982, pp.305–326.
L. L. Cherry, "Parts—A System for Assigning Word Classes to English Text", *Computing Science Technical Report* #81, Bell Labs, Murray Hill, NJ, Jun. 12, 1978, pp.1–17.
Chuck Reiger, et al., "Word Expert Parsing", Department of Computer Science, University of Maryland, pp. 723–728.
H. Maruyama, et al., "Communication Method with Applications by Natural Language", *IBM Technical Disclosure Bulletin*, vol. 31, No. 5, Oct. 1988, pp. 443–445.
P. Sells, "Lectures on Contemporary Shntactic Theories", CLSI, Stanford University, Stanford, CA, 1985.
R. M. Kaplan, et al., "Long Distance Dependencies, Constituent Structure, and the Functional Uncertainty", an article in a book by M. Baltin, et al., *Alternative Conceptions of Phrase Structure*, Chicago University Press, Sep. 1987.
Procedings of the 25th Annual Meeting of the Association for Computational Linguistics, Stanford University, Jul. 1987, pp. 131–134.

*Primary Examiner*—Dale M. Shaw
*Assistant Examiner*—Xuong Chung
*Attorney, Agent, or Firm*—John E. Hoel

[57] ABSTRACT

A computer method is disclosed for determining predicate-argument structures in input prose sentences of English. The input sentence, in the form of a string of words separated by blanks, is first analyzed (parsed) by a rule component that has access only to morphological and syntactic information about the words. The output of this rule component, in the form of a data structure consisting of attribute-value pairs, is then processed by the argument structure component, which consists of a set of partially ordered procedures that incorporate further linguistic knowledge. The output of these procedures is the same attribute-value structure, now enhanced by the presence of semantic (i.e. meaningful, non-syntactic) attributes. These semantic attributes, taken together, form the argument structure of the input sentence.

The resulting invention constitutes a fully modular, comprehensive and efficient method for passing from syntax to the first stage of semantic processing of natural (human) language. The invention applies to all prose sentences of the language for which it is designed, and not just to a subset of those sentences. It does not use domain-specific semantic information to improve the accuracy or efficiency of the syntactic component. It therefore constitutes an unrestricted broad-coverage method for natural language processing (NLP), as opposed to the restricted methods used in most NLP applications today.

Although the specific rules and procedures will be different for different natural languages, the general concept embodied in this invention is applicable to all natural languages.

2 Claims, 12 Drawing Sheets

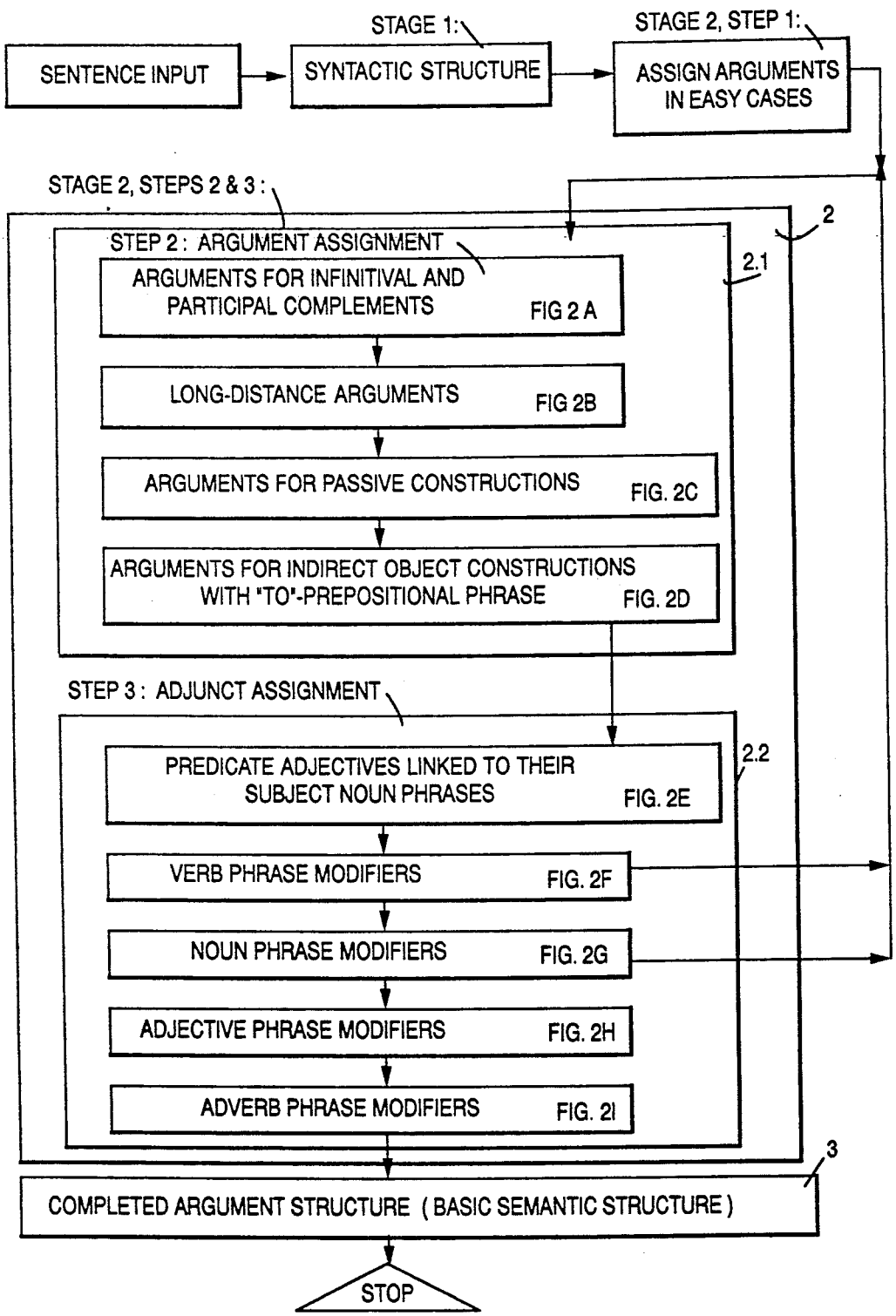

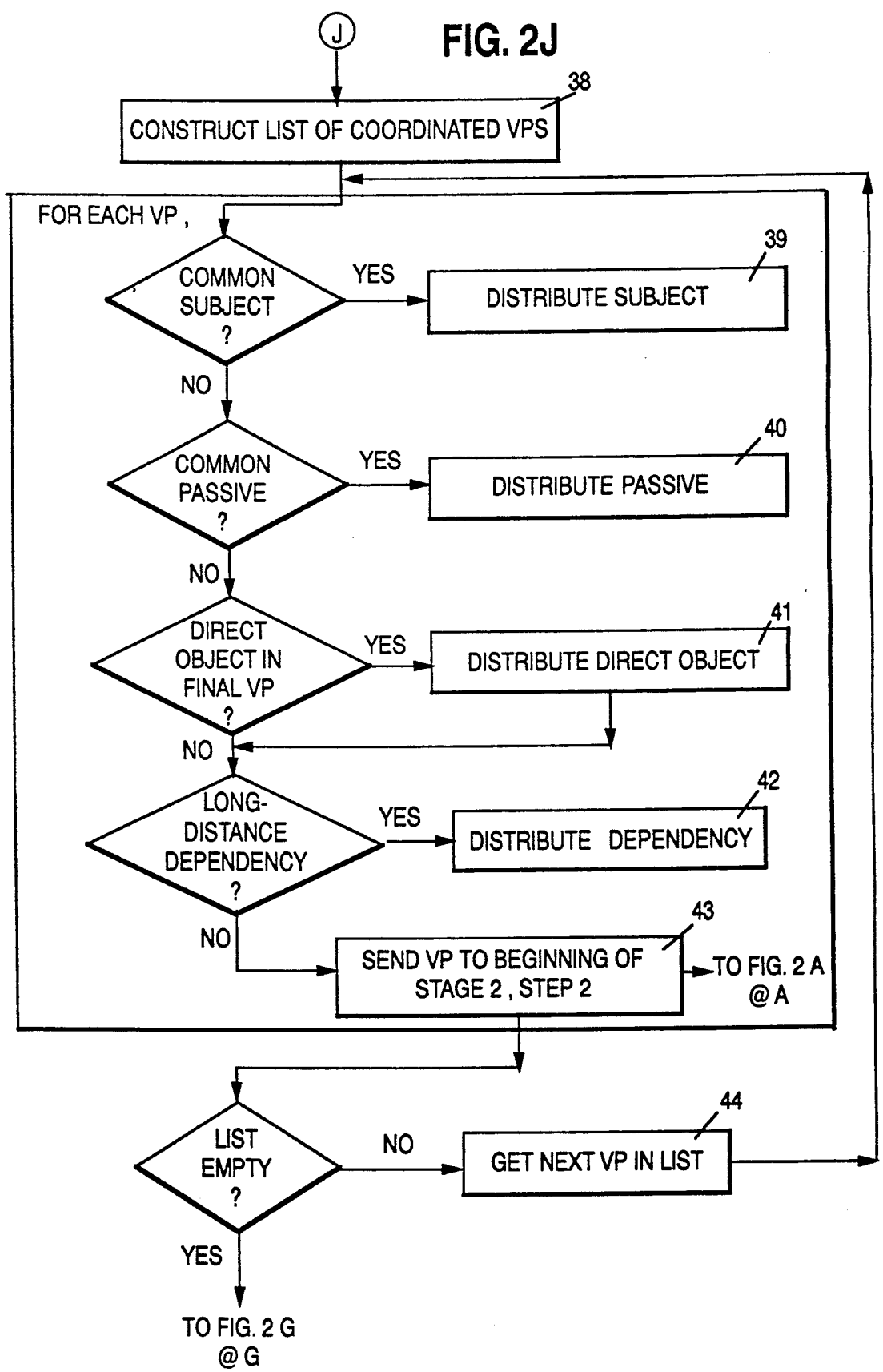

FIG. 3

SYNTACTIC PARSE TREE FOR THE SENTENCE:

```
49 — DECL1    NP1       NOUN1*    'ALICE'
                        PUNC1     ','
              NP2       NOUN2*    'PETER'
              VERB1*    'SAID'
              VP1       COMPL1    'THAT'
                        NP3       NOUN3*    'JOHN'
                        VERB2*    'KISSED'
              PUNC2     '.'
```

BASIC SEMANTIC (ARGUMENT) STRUCTURE FOR THE SENTENCE:

```
50 — PRED         'SAY'
     DSUBJECT    PRED       'PETER'
     DOBJECT     PRED       'KISS'
                 DSUBJECT   PRED      'JOHN'
                 DOBJECT    PRED      'ALICE'
```

COMPUTER METHOD FOR IDENTIFYING PREDICATE-ARGUMENT STRUCTURES IN NATURAL LANGUAGE TEXT

BACKGROUND OF THE INVENTION

1. Technical Field

The invention disclosed herein broadly relates to data processing methods for natural language processing (NLP), and more particularly relates to an improved data processing method for determining the basic semantic structures of sentences.

2. Background Art

Natural language texts may be said to consist of groups of propositions made up of predicates and their arguments. An example of a predicate is a verb, and its arguments can be exemplified by associated nouns or noun phrases. For example, in the sentence:

John loves Mary, there is one proposition, whose predicate is the verb "loves." "Loves" has two arguments in this proposition: "John" and "Mary."

In order for a computer system to understand natural language, it must be able to identify, correctly, the predicate and argument groups. For a simple sentence like the one above, this is not hard. If an English verb is closely surrounded by its arguments (as in "John loves Mary" above), then it is relatively easy for the computer grammar to assign the proper arguments to the verb. But for more complicated sentences, such as many that appear in real-life text, the task becomes much more difficult. The difficult problem arises when the arguments are not close to their verb.

In fact, arguments may sometimes be missing from the sentence entirely, and yet must be inferred by the program, just as a human would infer them. For example:

Mary was kissed.

In this sentence, the only visible argument for the verb "kissed" is "Mary." But we can infer another argument, corresponding to some person who did the kissing. Another, related, situation occurs in sentences like:

Who did Mary think that Peter said that John kissed?

In the foregoing sentence, again there are two arguments for the verb "kissed." "John" is close by, but "who," the second argument, is far away from its verb. The problem, then, is properly to link all arguments, including the missing and far-removed ones, with their predicates.

The problem of identifying predicate-argument structures—and, in particular, of correctly assigning "long-distance" dependencies" as in "Who did Mary think that Peter said that John kissed?"— is well known in the literature of linguistics and computational linguistics. Two chief methods have been described for accomplishing this:

the "empty category" (EC) approach;

the "functional uncertainty" (FU) approach.

The EC approach is advocated, for example, by linguists of the Government and Binding (GB) and Generalized Phrase Structure Grammar (GPSG) schools. (Sells, P. *Lectures on Contemporary Syntactic Theories*, CSLI, Stanford University, Stanford Calif., 1985) This approach uses parse structures that contain empty slots in the places wherein the dislocated constituents might be, if the sentence were in its most neutral form. For example, the sentence Alice, Peter said that John kissed. (=Peter said that John kissed Alice.) is supposed to have an "empty category," or "trace" (symbolized by "c"), right after the verb "kissed," because that is where the noun phrase "Alice" belongs. Computational grammars that are built along these lines actually specify empty slots in their parse structures, or trees (see FIG. 1A).

The FU approach is advocated by linguists who adhere to the theories of Lexical Functional Grammar (LFG). This approach bases its solution not on empty slots in a parse tree, but rather on the incremental evaluation of the characteristics of all the verbs ("characteristics" chiefly refers to the required number and kind of arguments that a verb must have), from left to right in a sentence, in order to find out where the displaced constituent best fits. A formal notational device has been added to the LFG grammar-writing language, for the purpose of computing the properly filled argument structures. (Kaplan, R. M. and A. Zaenen, "Long-distance Dependencies, Constituent Structure, and Functional Uncertainty", in M. Baltin and A. Kroch, eds., *Alternative Conceptions of Phrase Structure*, Chicago University Press, 1987.) Computational grammars that are built along these lines use this device, in their grammar rules, to specify where the missing argument should be assigned.

The present method differs from both of these approaches. It differs from the EC approach in that:

a. It does not use empty categories or traces of any kind;

b. It does not rely so heavily on the constituent, or tree, structure, but rather uses all sorts of information provided by the syntactic parse.

It differs from the FU approach in that:

a. It does not use any special notational devices other than those already provided by the programming language used;

b. It does not rely so completely on characteristics of verbs in the sentence (the so-called "functional information"), but rather uses all sorts of information provided by the syntactic parse.

It differs from both of the above approaches in that it performs the argument-filling after the syntactic parse has been completed. It uses a post-processor, and not the parsing component itself, to manipulate the full range of syntactic attribute-value information, in order to derive the most reasonable argument structure.

An additional difference between the present method and the methods of NLP systems that are motivated by linguistic theories is the fact that most of the latter systems currently use some form of unification, such as that provided by the logic programming languages. Unification allows for an automatic matching of attribute-value structures; but it has several drawbacks, such as its inability to deal elegantly with conditions of negation and disjunction. The present method, using a procedural post-processor, suffers no such drawbacks.

The present method is highly efficient; the post-processor adds no measurable time to the operation of the system. In addition, because the initial parsing component is completely domain-independent, the entire system provides extremely broad coverage for English.

Although the EC approach and the FU approach dominate current linguistic theory, neither one has been widely adopted in applications that make use of NLP techniques today. Prior art applications that include a semantic analysis of English text generally make use of some form of lexically-driven argument identification, but do not necessarily embrace the techniques or formalisms of EC or FU.

A prior art method for semantic processing of English text is disclosed in the *Proceedings of the 25th Annular Meeting of the Association for Computational Linguistics*, Stanford University, 6–9 Jul. 1987, pp. 131–134. The method disclosed therein is briefly explained below.

The prior art system is designed to handle a single semantic domain, namely, reports of failures in a specific type of machinery used on Navy ships. When an English sentence from this domain is inputted, the system makes a syntactic analysis of the sentence, and then maps the syntactic analysis onto an underlying format, or template, that specifies how many arguments can be related to the verb of that sentence, and what sorts of arguments those should be. Three different classes of arguments are defined: (1) obligatory, (2) essential, and (3) non-essential. Obligatory arguments must be present in the syntactic analysis, or the parse fails. Essential arguments need not be present in the syntax; but, if they are not, the system will hypothesize some "best guess" candidate to fill the role. Therefore both the essential and the obligatory arguments end up being present in the semantic structure of the sentence. Non-essential arguments may or may not be present.

For example, given the input sentence "Pump failed," the syntactic analysis should give "failed" as the main verb and "pump" as its syntactic subject. The underlying template for the verb "fail" should indicate that it has one argument, called the PATIENT. A mapping rule then suggests that "pump" is a good candidate for the PATIENT argument (arguments are also called "roles"). Next, restrictions are tested. For the verb "fail," there is a restriction saying that the filler of the PATIENT role must be a mechanical device. (In general, such information is carried by a feature—say, +MECH—that is marked on the dictionary entry for the noun "pump.") Since "pump" checks out as a mechanical device, the argument structure is completed: "failed" has one argument, its PATIENT, which is filled by "pump."

However, the prior art argument-filling method has several problems, as discussed below.

First, the possible meanings that words can have are severely limited, including only those that pertain to the domain in question. For example, the verb "fail" can have the meaning associated with sentences like:

The equipment failed, in which it has one obligatory argument ("equipment"). But the system may not interpret the verb "failed" in sentences like:

His courage failed him.

Today I took the chemistry exam and failed me a whopper!

The system counts on the fact that such sentences usually do not appear within the narrowly defined subdomain. But people use language in unpredictable ways; there is no guarantee that the verb "fail" would never be used, in Navy ship reports, with something like the meanings used above. The only way for the system to handle such sentences would be by means of additional templates for "fail." However, additional templates may cause much trouble for the syntactic analysis component.

Second, the process is complicated by the necessity to separate, for each verb, the three classes or arguments: obligatory, essential, and non-essential. The number of obligatory arguments varies with each different sense of a verb, and it is very difficult to specify precisely how many senses any given verb may have, even within a particular semantic subdomain.

Third, the flow of the system is hampered by the requirement that all essential arguments be filled, even if the filler is only a "best guess" hypothesis. In cases where fewer arguments are present in the syntactic structure than are required by the lists of obligatory and essential arguments, it is often necessary for the system to fail, back up, and try again, before achieving a successful parse for the sentence.

Fourth, in the prior art system, little or no attention is paid to the trickiest kinds of argument-filling, such as the "long-distance dependencies" discussed above. Again, the system counts of the fact that such complicated constructions are not expected to occur in narrow subdomains. Given the flexible nature of natural language, however, this is not a totally safe expectation.

Theoretical approaches to argument-filling discussed above (EC and FU) deal with the complexities of natural language, but their intrinsic complications make them difficult to use in practical applications. Prior art applications, although useable in the real world, within semantic subdomains, do not provide techniques for dealing with the full complexity of natural language, and will therefore remain limited in their scope of application.

Reference is made to U.S. Pat. No. 4,731,735 to K. W. Borgendale, et al., assigned to IBM Corporation, entitled "Multilingual Processing for Screen Image Build and Command Decode in a Word Processor, With Full Command, Message and Help Support," for its disclosure of a data processing system in which the invention disclosed herein can be executed. The disclosure of the above cited patent is incorporated herein by reference to serve as a background for the invention disclosed herein.

OBJECTS OF THE INVENTION

It is therefore an object of the invention to provide an improved method for determining the argument structures, or basic semantic structures, of English sentences.

It is another object of the invention to provide broad coverage of English, so that there is a high probability of success in determining the argument structure for any input sentence of English, and not just for sentences that pertain to a restricted semantic domain.

It is a further object of the invention to provide efficient techniques for semantic processing, by using a fully modular approach coupled with procedures that work entirely by consulting, adding to, and subtracting from, attribute-value data structures, and that are not restricted by any predicate-argument templates that specify how many arguments a verb (or any word) must have in order to be understood.

SUMMARY OF THE INVENTION

These and other objects, features and advantages are accomplished by the invention disclosed herein. A computer method is disclosed for determining predicate-argument structures in input prose sentences of English. The input sentence, in the form of a string of words separated by blanks, is first analyzed (parsed) by a rule component that has access only to morphological and syntactic information about the words. The output of this rule component, in the form of a data structure consisting of attribute-value pairs, is then processed by the argument-structure component, which consists of a set of partially ordered procedures that incorporate further linguistic knowledge. The output of these procedures is the same attribute-value structure, now enhanced by the presence of semantic (i.e., meaningful, non-syntactic) attributes. These semantic attributes, taken together, form the argument structure of the input sentence.

The resulting invention constitutes a fully modular, comprehensive and efficient method for passing from syntax to the first stage of semantic processing of natural (human) language. The invention applied to all prose sentences of the language for which it is designed, and not just to a subset of those sentences. It does not use domain-specific semantic information to improve the accuracy or efficiency of the syntactic component. It therefore constitutes an unrestricted broad-coverage method for natural language processing (NLP), as opposed to the restricted methods used in most NLP applications today.

Although the specific rules and procedures will be different for different natural languages, the general concept embodied in this invention is applicable to all natural languages.

A NLP method is disclosed for determining basic semantic structures for English input strings. In order to achieve these objects in accordance with the present method, an input string of English is processed in the following manner. In accordance with the invention, there are two stages in the method, the first being performing a syntactic parsing without a semantic component, and the second being performing the semantic analysis.

First, an input string is analyzed by a syntactic parsing component. As an example, the preferred embodiment uses a syntactic parser called the PLNLP English Grammar (PEG). ("PLNLP" is the name of a programming language; the acronym stands for Programming Language for Natural Language Processing.) PEG provides a syntactic analysis for each input string. The analysis consists of a collection of attributes and values. Such a collection is called a "record" or "record structure."

During the stage of syntactic analysis, PEG makes no attempt to complete the assignment of arguments to each verb. However, the analysis that PEG provides does contain all of the information necessary to figure out, and to fill in, all of the arguments.

The argument structure is created by enhancing the syntactic parse record with additional attributes that are intended to have semantic values. Syntax is often called the "surface" structure, and semantics is called the "deep" structure, of the input string. The following "deep" attributes have been defined; others may be added if needed:

a. DSUBJECT—"deep" (or semantic) subject of the proposition; generally, the doer of an action
b. DOBJECT—"deep" (or semantic) object of the proposition; the entity that is most directly affected by the action of the doer
c. DINDOBJ—deep indirect object; the entity that experiences something, or retrieves something, through the action of the doer
d. DPREDNOM—the entity that is equated with the DSUBJECT in a proposition
e. DOBJCOMP—the entity that is equated with the DOBJECT in a proposition After leaving the syntactic parsing stage, in accordance with the invention a record goes to the first step of the semantic analysis stage. Here the semantic arguments are identified in the easy cases—namely, those which are, by syntactic standards, close to and clearly associated with their verbs. This is simply a matter of adding "deep" argument attributes, and making them point to the same values as do their "surface" syntactic counterparts (DSUBJECT=SUBJECT; DOBJECT=OBJECT; etc.).

There are two further steps in the semantic analysis stage. In the second step, arguments are assigned and completed as follows:

Missing arguments of infinitive clauses and participial clauses are assigned.
Displaced or "long-distance" arguments are assigned.
Missing or displaced arguments is passive constructions are assigned.
Arguments for the two different forms of the indirect object construction in English are equated.

This completes the step of argument assignment. Optionally, this step can be augmented by devising procedures to handle argument assignment for other syntactic situations, if these are discovered.

Within these core procedures, ordering is important to some degree. For example, the sub-procedure that assigns missing arguments to infinitival and participial clauses must be ordered first in the list. The sub-procedure that handles displaced ("long-distance") arguments must be ordered before the passive procedure.

After all arguments have been properly assigned, the post-processor begins its third step, where it reviews the parsed segments that are not arguments of the main verb. These non-argument segments are called "adjuncts." This review results in the further enhancement of the record structure with the addition of semantic attributes that point to all non-argument modifiers of the major classes VP (verb phrase), AJP (adjective phrase), AVP (adverb phrase), NP (noun phrase), and PP (prepositional phrase) The following semantic attributes have been defined; others may be added when needed:

a. MODS—modifier; not further specified
b. NADJ—adjective premodifying noun
c. PADJ—predicate adjective or adjective postmodifying noun
d. OPS—operator; includes determiners and quantifiers
e. PARTICL—preposition or adverb that combines with a verb to signal a significant change in the argument structure of the verb phrase
f. PRED—basic form of each word
g. PROP—propositional modifier; may include infinitives and participial phrases
h. REF—the noun to which a pronoun refers Final adjustments are made to the record structure, erasing some unwanted attributes, and generally cleaning up the record structure before it moves on to the next component of the system. The record structure which is output can be used by machine translation devices to provide more accurate translations of one natural language into another. The output can also be applied to advanced text critiquing, improved information retrieval, electronic mail routing and filing, automatic text generation, and any other NLP applications that require a basic semantic analysis.

BRIEF DESCRIPTION OF THE DRAWINGS

The foregoing and other advantages of the invention will be more fully appreciated with reference to the accompanying figures.

FIG. 2 depicts the relationship of FIGS. 2A-K illustrating the flow diagram of the method for determination or argument structures.

FIG. 2J is the portion of the flow diagram which processes coordinated verb phrases.

FIG. 3 shows the parse tree and a display of the completed basic semantic structure (argument structure) for the sentence "Alice, Peter said that John kissed," illustrating the proper resolution of a long-distance dependency.

DESCRIPTION OF THE BEST MODE FOR CARRYING OUT THE INVENTION

Figure 1A:
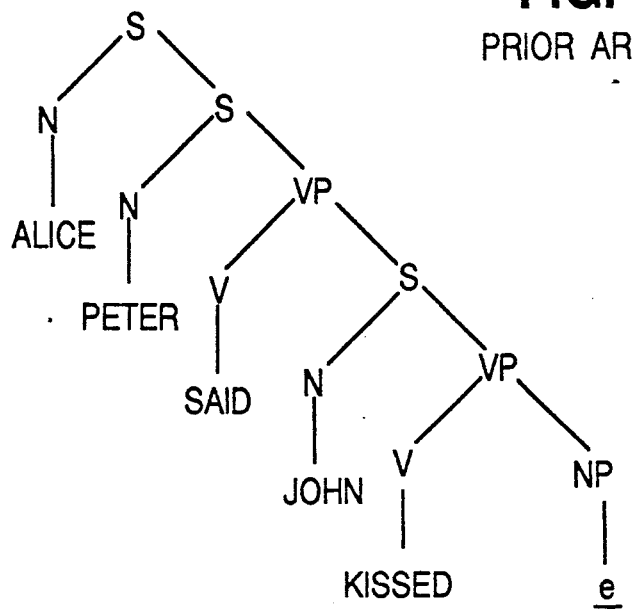
FIGS. 1A and 1B illustrate prior art methods for the determination of missing arguments, according to current linguistic theories.
Figure 1B:
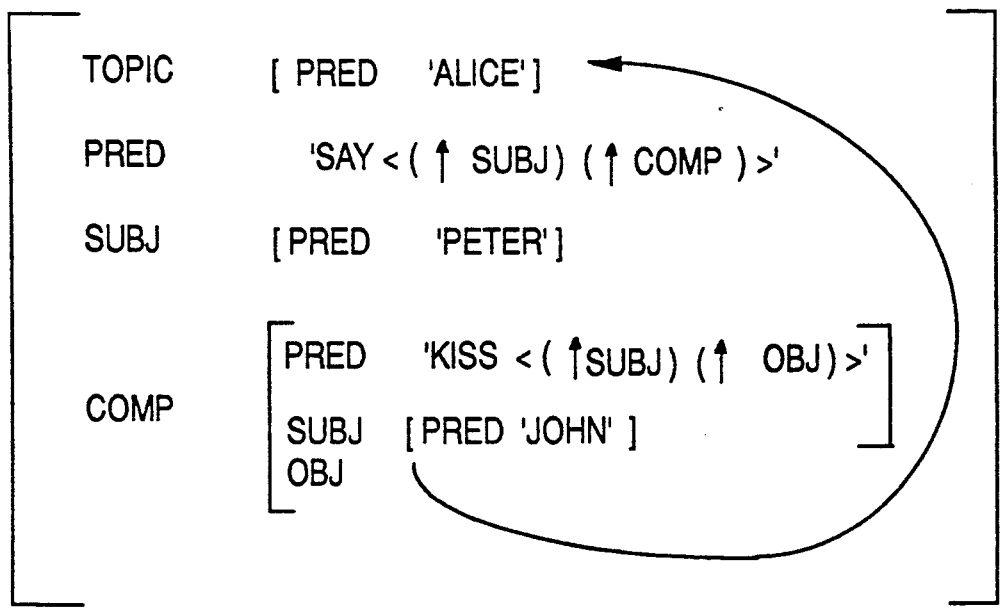

FIG. 2 shows an overall configuration of the present system. It comprises an input stage; an analysis stage that produces the syntactic structure; a preliminary post-analysis step in which arguments are assigned in the cases when semantic arguments are identical to syntactic arguments (1); the main post-processor (2), which determines the arguments in all other cases, and which itself comprises a step of assigning semantic arguments (2.1) and another step of assigning adjuncts (2.2); and finally the completed argument structure (3), which is the basic semantic structure corresponding to the input string.

During the input stage, a string of words is entered into the system. This is usually done by typing the text at a keyboard, although the string may be entered by any other means. For example, if a speech recognition component were available, the text could be entered by human voice.

The syntactic analysis stage is accomplished by the syntactic parsing component, PEG. PEG produces, for each input string, a syntactic description in the form of an attribute-value "record" structure. A more readable syntactic parse "tree" is also displayed from the information contained in the record structure. PEG has access to a very large English vocabulary list (often called a lexicon), and to the standard morphological rules of English. However, the lexicon, in combination with these rules, provides only limited morphological and syntactic information to PEG, of the following sort:
 the orthographic form (spelling) of most English words;
 parts of speech that each word may have in English;
 information about tense, number, and so forth—that is, morphological information—for each part of speech given for each word;
 information about the various syntactic subcategorization classes that each word might belong to (for example, whether a particular verb can be transitive or not).

PEG is a large program written in PLNLP (the Programming Language for Natural Language Processing). It consists of about 200 augmented phrase structure rules driven by a bottom-up, fully parallel processing algorithm. These rules produce the syntactic analysis of the input string. Whether a particular rule will be applicable to a particular string, or part of that string, is governed by the presence or absence of certain attributes, and their values, in the record structure covering that string. Some attributes are provided by the lexicon, and some are added by the rules themselves. What PEG does is to produce a syntactic description of a string by starting with the records for individual words, and incrementally building a larger and larger record structure, until finally a structure is arrived at which is the analysis of the entire input string. It is noteworthy that PEG uses only morphological and syntactic information, and no semantic information at all (see above), to make the analysis.

A lot of information is contained in the attribute-value analysis structures. Some of this information is simple: for example, a PAST attribute in the record for a verb phrase may have a value of "one" or "off." If it is "on," it indicates that that verb phrase is in the past tense. Some information is more complicated: for example, a verb phrase may have an attribute SUBJECT, which has as its value a pointer to another entire record structure that covers the noun phrase acting as its subject, with all of the information pertaining to that noun phrase.

All attributes assigned by PEG are syntactic attributes. Among these are some (like SUBJECT) that refer to the syntactic arguments of the input string. The first stage of semantic post-processing, according to the method disclosed herein, is to identify semantic arguments when these correspond exactly to the syntactic arguments. To do this, the post-processor simply adds a semantic attribute to the record and makes it point to the same value as its syntactic counterpart. (DSUBJECT points to the same record that SUBJECT points to, for example.)

The next stage of post-processing handles all the remaining cases of argument identification.

First, the post-processor scans the record structure to look for infinitival or participial verb complements, or for participial subject complements that appear at the end of a sentence, rather than adjacent to their subject noun phrases. Suppose it finds a present participle that is a verb complement (4). For example, in the sentence John, in my opinion, likes entertaining women,
the words "entertaining women" form a present participle clause, a complement of the main verb "likes." The semantic object (DOBJECT) of that clause is the noun "women"; "women" is present as a syntactic object, and has been identified as the semantic object by the first stage of post-processing. But there is no syntactic subject for "entertaining women." Furthermore, it is not possible, at this stage, to decide on the correct semantic subject for "entertaining women," because we have no idea who is doing the entertaining. It might be John who is entertaining the women, or it might be someone entirely different. There is even the possibility that the women might be entertaining John, in which case this would not be a participle clause, but a noun phrase with "entertaining" serving as adjective. Therefore a dummy semantic subject ('XX') is assigned as the value of the attribute DSUBJECT in this case. This completes the argument assignment for the verb "entertain" in the sentence above. In some later component of the system, the most likely DSUBJECT for "entertain" will be computed.

Figure 2A:
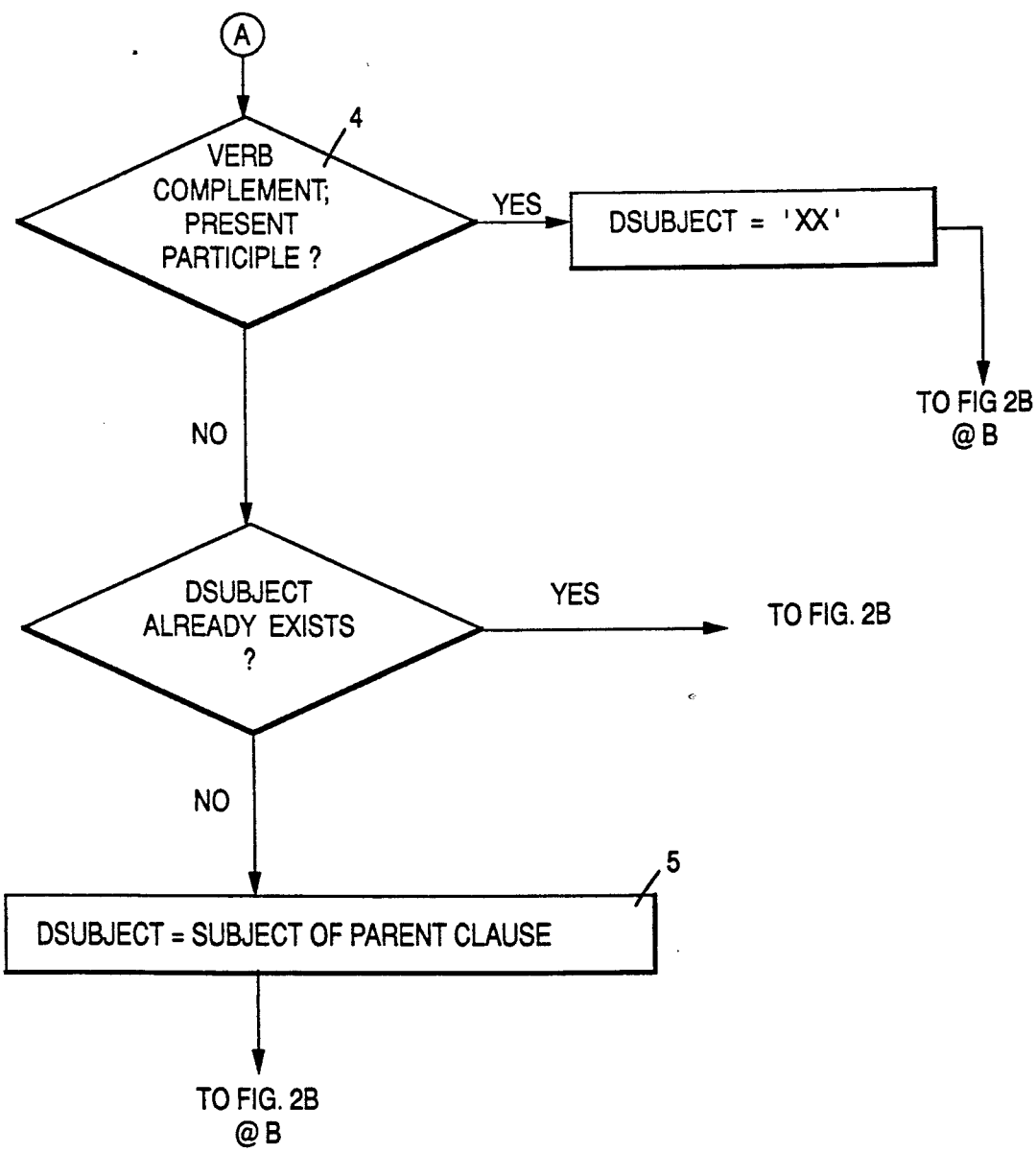
FIG. 2A shows the portion of the flow diagram which processes infinitival and participial complements.

For all other cases in FIG. 2A, if a DSUBJECT already exists in the clause, then the procedure stops; otherwise, the syntactic subject of the parent clause is assigned as the DSUBJECT of the clause in question (5). As an example of a participial subject complement, consider the sentence Mary, as you predicted, arrived excitedly waving her hands.

"Waving her hands" is not a complement of the main verb "arrived." It is a participle clause that goes with, or complements, the subject of the main clause, "Mary." "Waving" has a syntactic object ("her hands"), which is immediately identified as its semantic object, or DOBJECT. However, there is no syntactic subject for "waving her hands." Step (5) identifies "Mary" as its semantic subject (DSUBJECT).

Figure 2B:
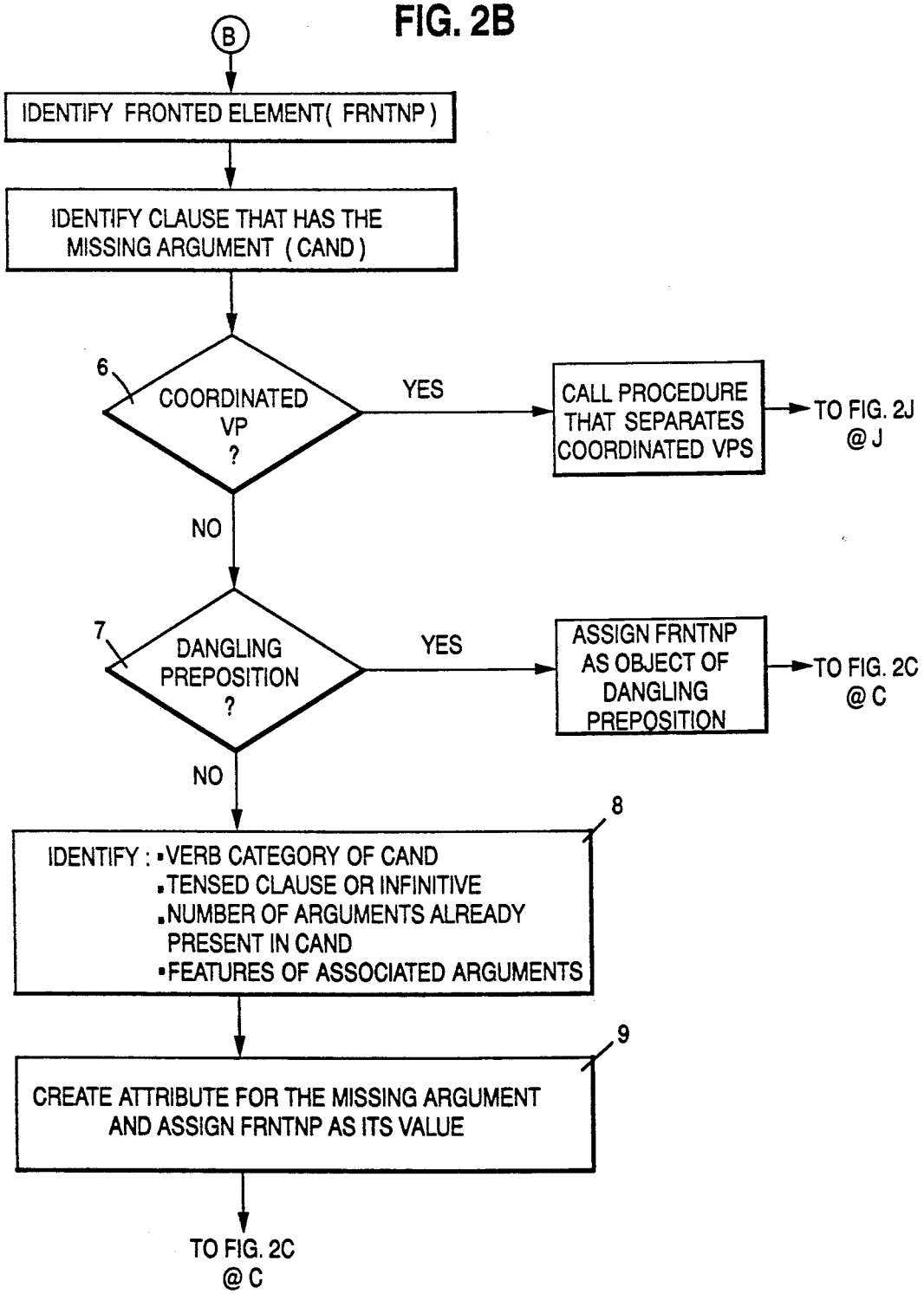
FIG. 2B is the portion of the flow diagram which processes long-distance arguments.
Figure 2C:
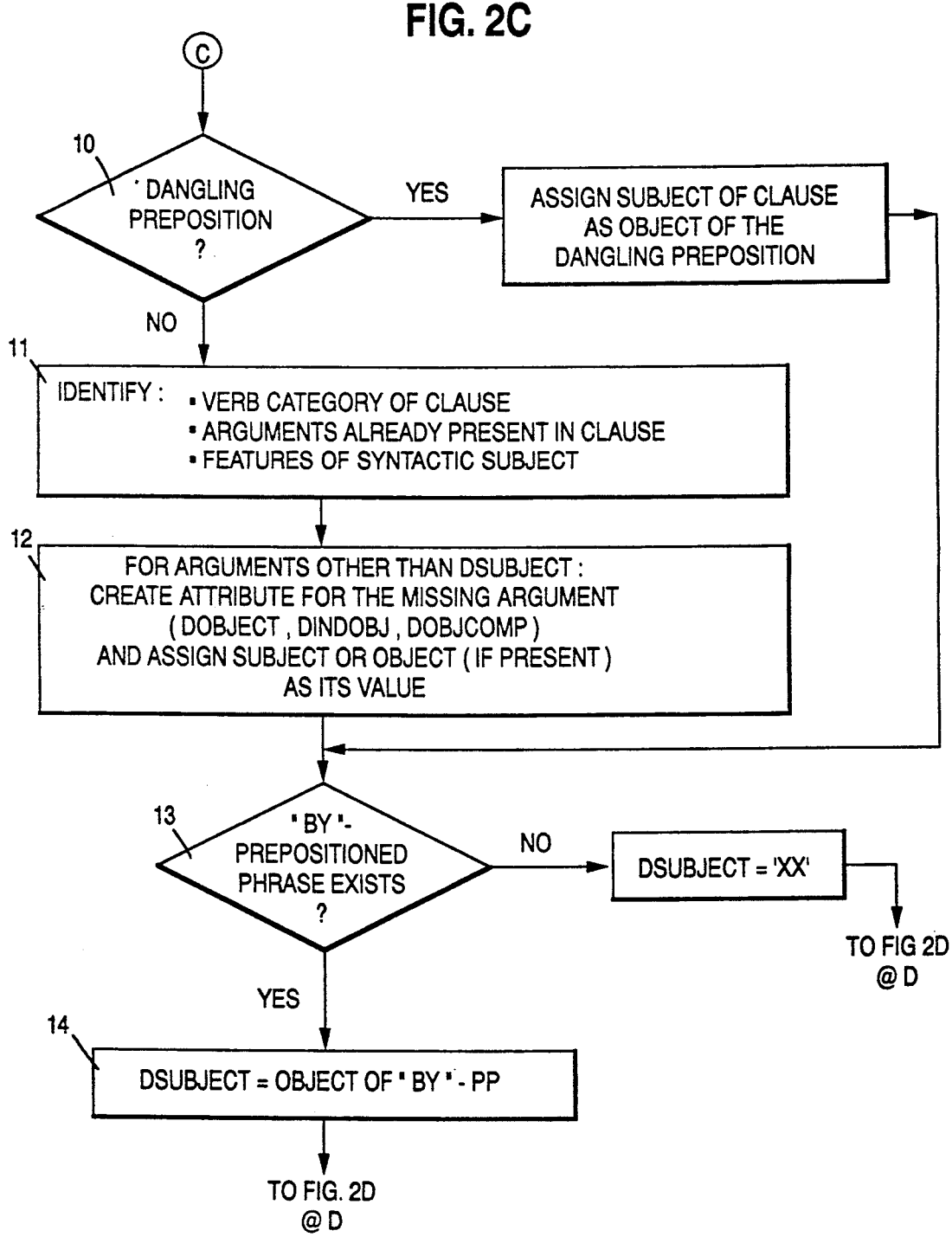
FIG. 2C is the portion of the flow diagram which processes passive constructions.
Figure 2D:
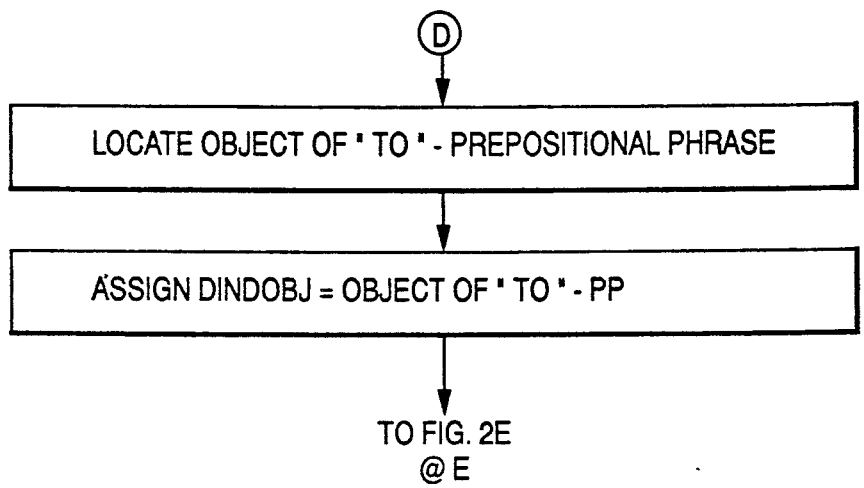
FIG. 2D is the portion of the flow diagram which processes indirect object constructions where the indirect object is in a prepositional phrase with the preposition "to."

FIG. 2B presents a flow diagram for the procedure that handles long-distance arguments. Currently four different long-distance situations are treated:
 a. topicalizations: "Alice, Peter said that John kissed."
 b. wh-questions: "Who did Peter say that John kissed?"
 c. relative clauses: "that is the girl who Peter said that John kissed."
 d. free relatives: "I know who Peter said that John kissed."

The procedure identifies the fronted long-distance element (e.g., the italicized words in the sentences above), and calls this element FRNTNP. Then it identifies the clause that is the candidate for the long-distance relationship, and calls this CAND. CAND is usually the final clause in a list of clauses postmodifying the main verb, said list including complement clauses and infinitive clauses, but not, for example, subordinate clauses introduced by a subordinate conjunction.

If CAND itself contains coordinated verb phrases (6), as in

Who did Peter say that John kissed and hugged?
then it is sent to the procedure that separates coordinated verb phrases (see FIG. 2J). Eventually the separated elements will be routed back to the long-distance procedure. The next consideration is whether or not CAND contains a dangling preposition (7), as in Who did Peter say that John ran into?
In the foregoing sentence, CAND is "John ran into" and the dangling preposition is "into." In a case like this one, FRNTNP will be assigned as the object of the dangling preposition ("John ran into who?"), and the procedure terminates. The clause is available for further argument identification, if necessary.

If there is no coordination in CAND, and no dangling preposition in CAND, then the main business of this procedure begins.

A complex set of information is necessary to identify properly the argument for a long-distance dependency (8). First, the subcategorization class of the main verb in CAND is important: is it complex-transitive, ditransitive, or neither? A complex-transitive verb takes an object and an object complement: "They elected him (object) President (object complement)." A ditransitive verb takes an indirect object and an object: "They gave her (indirect object) an award (object)." Second, is CAND a tensed clause or an infinitive clause? Third, how many arguments are already present in the clause? Fourth, what features are present on the arguments that are already present, as well as on the long-distance element (FRNTNP)?

The feature that is of particular interest here, HUM, is attached to some pronouns ("who," "I," "you," "he," "she," etc.) and to some nouns ("man," "woman," "child," etc.). Although the feature clearly has a meaningful interpretation, it should not be regarded, for present purposes, as semantic. It is simply a feature, like any other feature, that can be attached to members of a list of words. It indicates a high probability that the word to which it is attached will behave, syntactically, in a certain way under certain circumstances. Therefore the existence of this feature, which comes from the lexicon, is not a contradiction to the earlier claim that the syntactic parsing component words without semantic information.

Based on the information that has been described, the procedure resolves the long-distance dependency (9). In the sentence Who did John want to kiss?
FRNTNP ("who") is assigned as the DOBJECT of the verb "kiss"; it is most directly affected by the verb's action. In the sentence Who did John want to write?
FRNTNP ("who") is assigned as the DINDOBJ of the verb "write"; it receives something through the verb's action. In the sentence What did John want to write?
FRNTNP ("what") is assigned as the DOBJECT of the verb "write."

When a passive construction is encountered (FIG. 2C), the post-processor again considers whether or not there is a dangling preposition in the passivized clause (10), for example:

The house was broken into.
If a dangling preposition is present, like "into" in the foregoing sentence, the syntactic subject ("the house" in this case) will be assigned as the object of the dangling preposition ("broken into the house"). Then the procedure skips ahead to locate a possible "by"-prepositional phrase (13), and to identify a semantic subject.

If there is no dangling preposition, a complex set of information is consulted to identify properly the semantic arguments for a passive construction (11). First, the subcategorization class of the main verb is important: is it complex-transitive, ditransitive, or neither? (See above.) Second, how many arguments are already present in the clause? Third, what features are present on the syntactic subject of the clause?

The feature that is of particular interest here, ANIM, is very like HUM in all respects except that it attaches to nouns that most probably refer to living beings, not just human beings. Again, although the feature clearly has a meaningful interpretation, it should not be regarded as semantic in its present use.

Next, the procedure assigns semantic arguments other than DSUBJECT, based on the information that has been described (12). In the passive sentence The main was elected President.
"the man" is the DOBJECT, and "President" is the DOBJCOMP. In the sentence He was given a mandate.
"he" is the DINDOBJ (receiving something), and "a mandate" is the DOBJECT (the thing received). In the sentence You were invited.
"you" is the DOBJECT; there is no DOBJCOMP or DINDOBJ.

The procedure moves on to assign a DSUBJECT of the passive construction. It checks to see if a "by"-prepositional phrase exists (13). If not, the DSUBJECT is assigned a value of 'XX', which can be resolved later, if and when the necessary information is processed. If the "by"-PP exists, then DSUBJECT is assigned to point to the object of that prepositional phrase (14). For example, in the sentence You were invited by the President.
"the President" is the DSUBJECT. This sentence is the passive equivalent of the active sentence "The President invited you." In both sentences, the DSUBJECT is "the President" and the DOBJECT is "you." In this manner, although the surface syntactic forms of active and passive sentences are quite different, the underlying argument structure demonstrates their semantic similarity.

The next sub-procedure (FIG. 2D) handles the indirect object construction. The purpose of this procedure is to demonstrate the semantic similarity between sentences like "We gave him a mandate" and "We gave a mandate to him." In this respect, the indirect object procedure has the same purpose as the passive procedure. It is, however, much simpler. The first step is to locate the object of the "to"-prepositional phrase; the next step is to assign this object as the value of the DINDOBJ attribute. When this step has been completed, both of the sentences under discussion will have a DSUBJECT of "we," a DINDOBJ of "him," and a DOBJECT of "a mandate."

This concludes the first step (2.1) of the central part of the post-processor, in which semantic attributes are assigned their values, and an argument structure is built for the input string. The second step (2.2) involves the assignment of semantic adjuncts—modifiers that are not arguments, but that are nevertheless important for the final semantic structure.

Figure 2E:
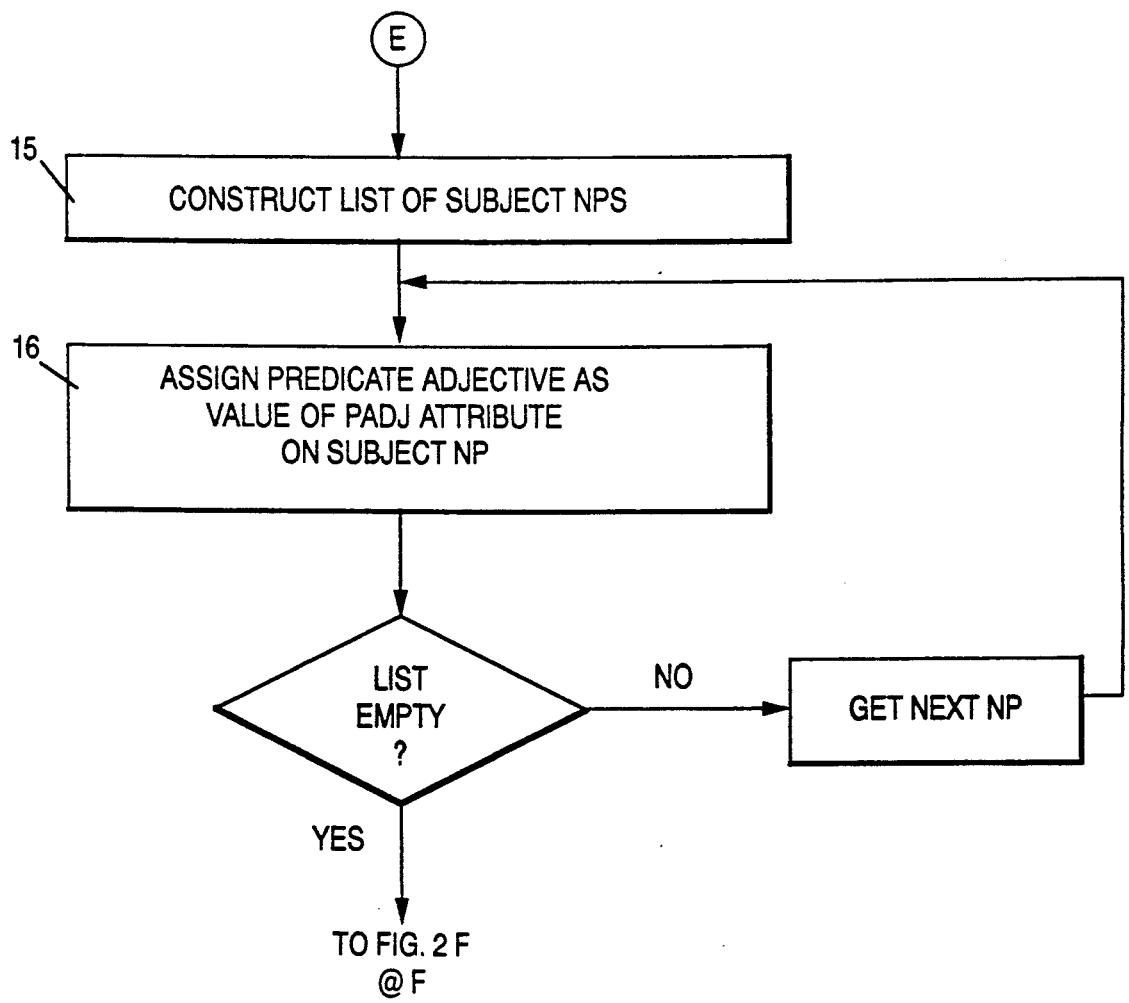
FIG. 2E is the portion of the flow diagram which links predicate adjectives with their subject noun phrases.
Figure 2F:
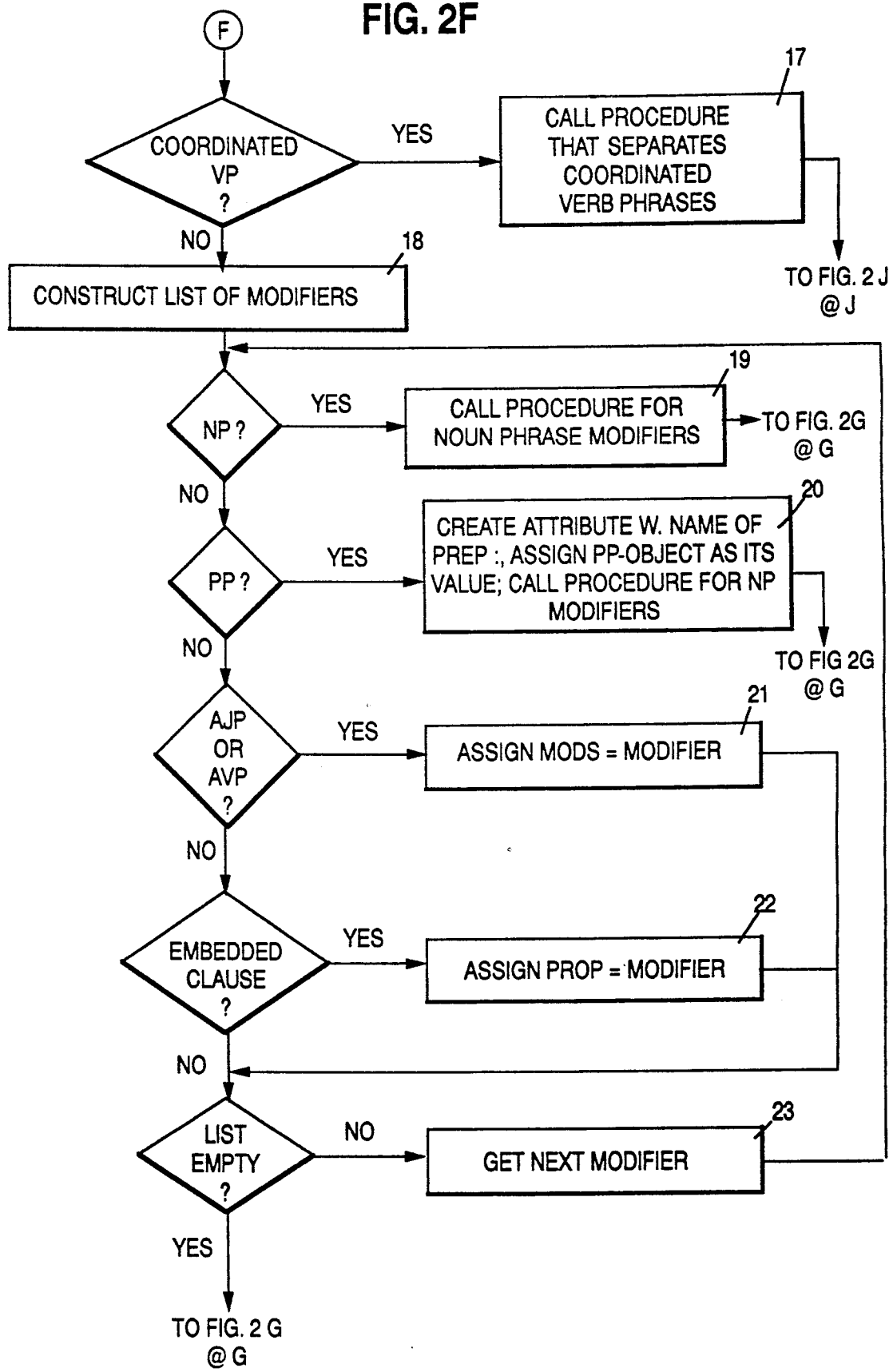
FIG. 2F is the portion of the flow diagram which processes verb-phrase modifiers.

The first phase in this second step is to link predicate adjectives with their subject noun phrases (FIG. 2E). An example of a predicate adjective construction is the sentence Mary and John are, and always will be, happy.
The adjective "happy" applies to both "Mary" and "John" in the subject noun phrase "Mary and John"; but it is quite far removed from that NP. If the phrase were "happy John and happy Mary," there would be no problem. But the syntactic analysis of the foregoing sentence does not make the proper connection directly, because of the displacement of the adjective from the subject. In this respect, the problem of linking predicate adjectives with their NI's is like the problem of long-distance dependencies.

The first step in solving this problem is to construct a list of the subject noun phrases (15). If there is only one subject NP, then the list will be a list with one member. On each member of the list, a PADJ attribute is created, with its value a pointer to the predicate adjective (16). Then the next member of the list of subject NI's is processed. When the list is empty, the procedure terminates.

All arguments having been identified, the post-processor considers the major phrase categories VP, NP (including PP), AJP, and AVP, to make sure that all non-argument modifiers are assigned to their proper semantic attributes. (These non-argument modifiers are also called "adjuncts.")

Figure 2G:
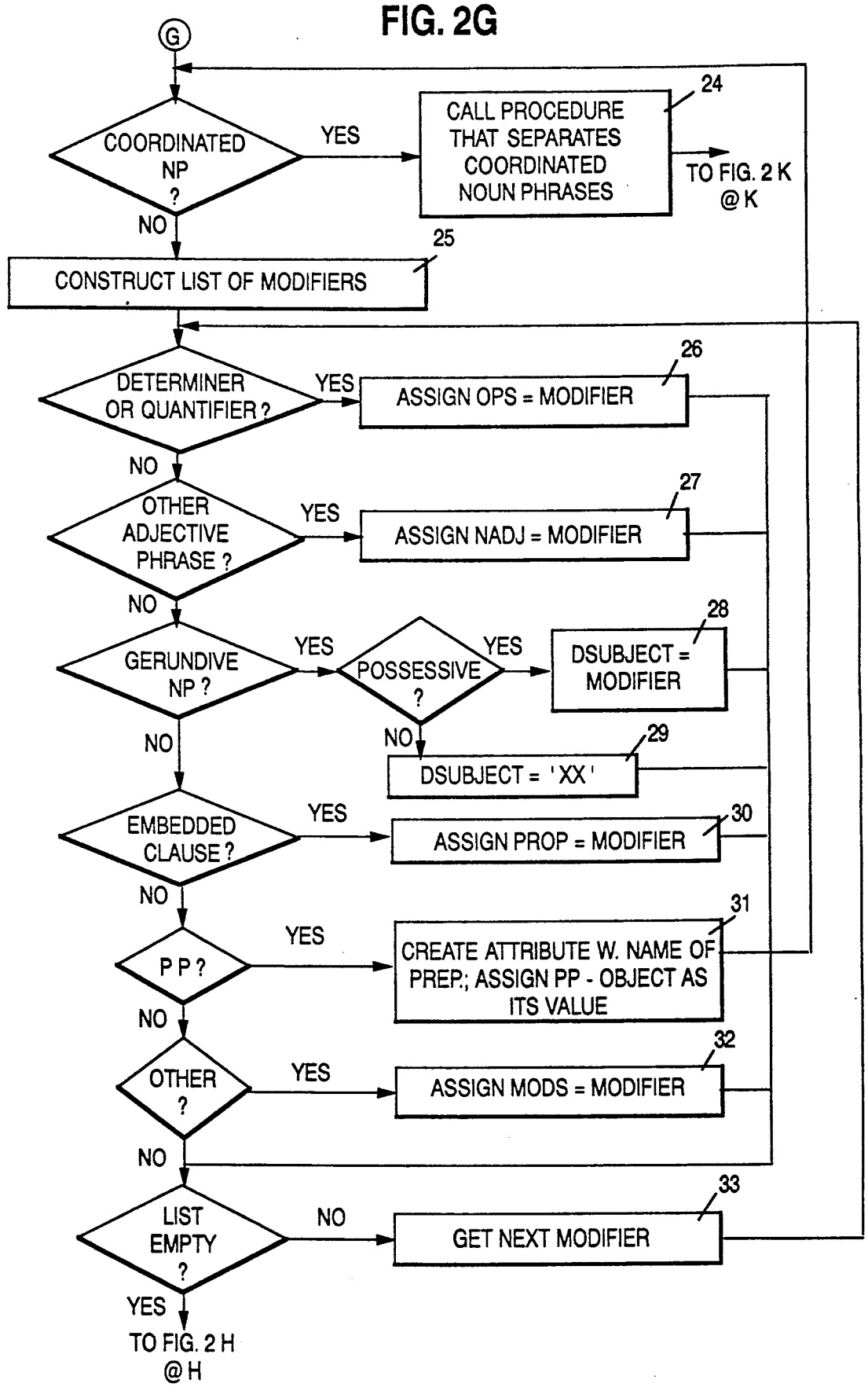
FIG. 2G is the portion of the flow diagram which processes noun-phrase modifiers.
Figure 2H:
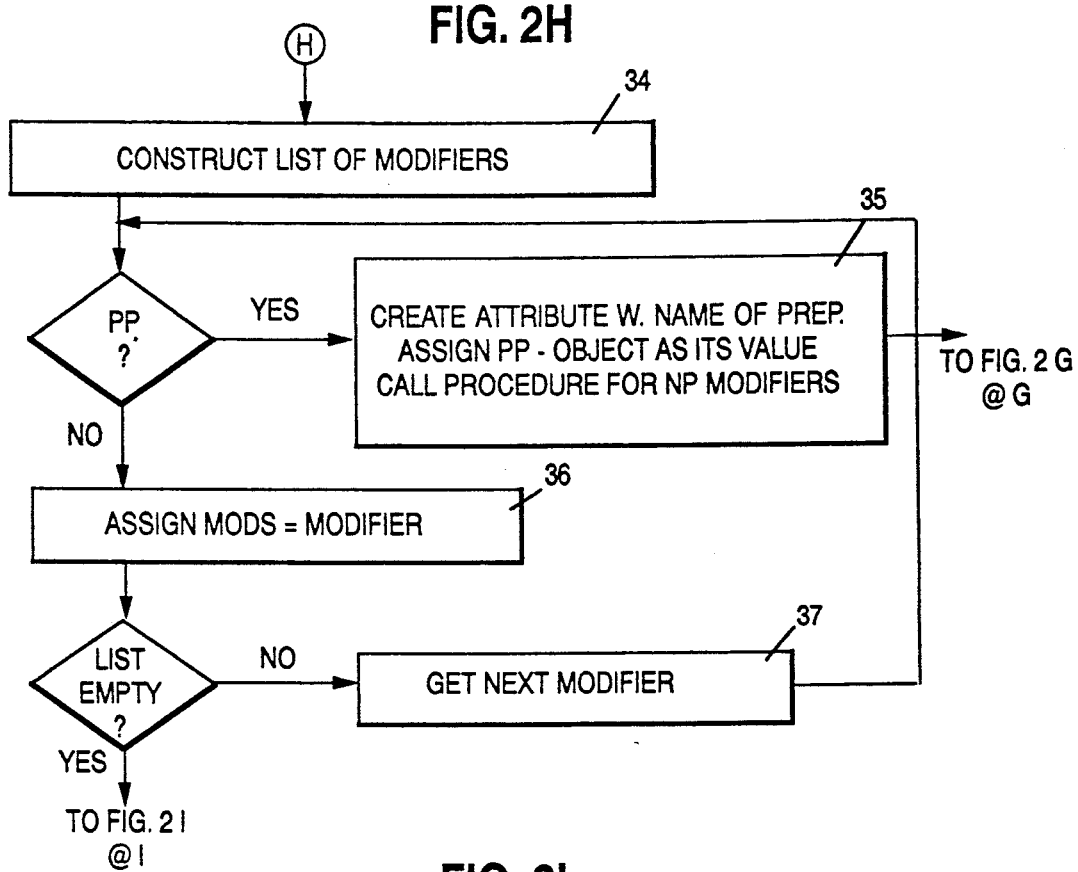
FIG. 2H is the portion of the flow diagram which processes the modifiers of adjective phrases.
Figure 2I:
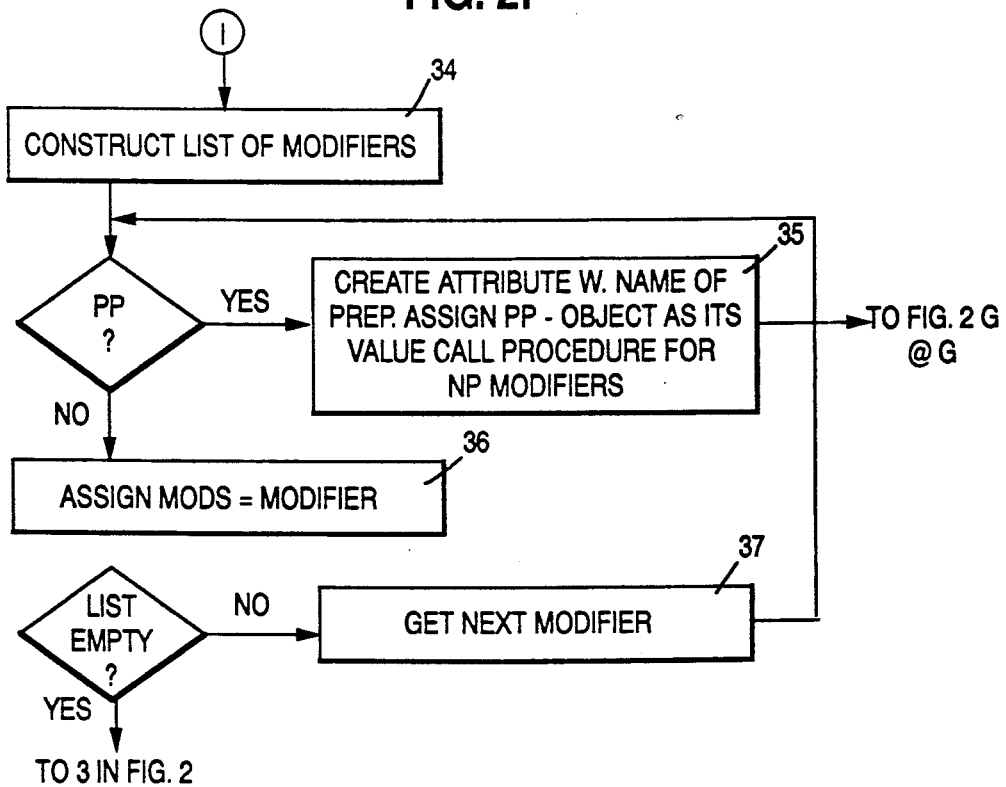
FIG. 2I is the portion of the flow diagram which processes the modifiers of adverb phrases.

The first category to be considered is the verb phrase (FIG. 2I). If a verb phrase itself contains coordinated VPs, then it is sent to the procedure that separates coordinated VPs (17). The separated elements will be routed back to the main procedure. If the VP is not a coordinated segment, then a list of fall modifiers, both pre-modifiers and post-modifiers, is constructed (18). For each member of that list, a. If it is a NP, then it is sent to the procedure that handles NP modifiers (19).
b. If it is a PP, then
1. An attribute is created on the VP, this attribute having the same name as the preposition in the PP (20);
2. The object of the PP is assigned as the value of this attribute (20);
3. The segment is sent to the procedure that handles NP modifiers (see FIG. 2G).
c. If it is an adjective phrase or an adverb phrase, then a MODS attribute is created on the VP, with its value being a pointer to the AJP or AVP (21).
d. If it is an embedded clause (for example, a subordinate clause), then a PROP attribute is created on the VP, with its value being a pointer to the embedded clause (22).

Then the next member of the list of modifiers is processed (23). When the list is empty, the procedure terminates.

The next category to be considered is the noun phrase (FIG. 2G). If a noun phrase itself contains coordinated NPs, then it is sent to the procedure that separated coordinated NPs (24). The separated elements will be routed back to the main procedure. If the NP is not a coordinated segment, then a list of all modifiers, both pre-modifiers and post-modifiers, is constructed (25). For each member of that list, a. If it is a determiner or quantifier (words like "the" "a," "this,"."some," "all," etc.), then an OPS ("operators") attribute is created on the NP, with its value being a pointer to the determiner or quantifier (26).
b. If it is an adjective phrase other than a determiner or quantifier, then a NADJ attribute is created on the NP, with its value being a pointer to the adjective phrase (27).
c. If the NP is a gerund (noun ending in "-ing"), then,
1. If the phrase being considered is a possessive adjective, then a DSUBJECT attribute is created on the NP, with its value being a pointer to the possessive adjective (28).
2. If there is no possessive adjective in the gerundive NP, then a DSUBJECT attribute is created on the NP, with its value being 'XX' (29). This value can be changed when more information is available.

d. If the phrase being considered is an embedded clause (for example, a relative clause), then a PROP attribute is created on the VP, with its value being a pointer to the embedded clause (30).
e. If it is a PP, then
  1. An attribute is created on the NP, this attribute having the same name as the preposition in the PP (31);
  2. The object of the PP is assigned as the value of this attribute (31);
  3. The segment is sent back to the procedure that handles NP modifiers (that is, to the procedure in FIG. 2G, currently being discussed).
f. If the phrase being considered is something other than those mentioned here, then a MODS attribute is created on the NP, with its value being a pointer to this other phrase (32).

Then the next member of the list of modifiers is processed (33). When the list is empty, the procedure terminates.

For identifying the semantic modifiers on adjective phrases and adverb phrases (FIGS. 2H and 2I), the procedure steps are identical. First a list of all modifiers is constructed (34). For each member of that list,
a. If it is a PP, then
  1. An attribute is created on the AJP or AVP, this attribute having the same name as the preposition in the PP (35);
  2. The object of the PP is assigned as the value of this attribute (35);
  3. The segment is sent to the procedure that handles NP modifiers (see FIG. 2G).
b. Otherwise, a MODS attribute is created on the AJP or AVP, with its value being a pointer to the list member under consideration (36).

Then the next member of the list of modifiers is processed (37). When the list is empty, the procedure terminates.

FIG. 2J illustrates the process of separating coordinated verb phrases. This procedure is called from the procedure that handles VP modifiers (see FIG. 2F). First a list is constructed of all VPs that are within the larger coordinated VP (38). Then, for each member of that list of VPs,
a. If the coordinated VPs have a common syntactic subject, then that subject is distributed to each member VP in the list (39). An example is
John came in and sat down.
  In the foregoing sentence, "John" is the syntactic subject for both of the coordinated VPs "came in" and "sat down."
b. If the clause is passive (e.g., "John was hugged and kissed"), then a PASSIVE attribute is set "on" in each member VP (40).
c. If there is a syntactic direct object in the final VP, then that object is distributed to each transitive member VP in the list (41). An example is
John wrote and signed the document.
  In the above sentence, "the document" is the syntactic object for both of the coordinated VPs "wrote" and "signed."
d. If there is a long-distance dependency in the clause, then the fronted element is distributed to each member VP in the list (42). An example is
What did Peter say that John wrote and signed?
  In the above sentence, the fronted question word "what" is distributed to the VP "wrote" and to the VP "signed." The dependency will later be resolved by the procedure displayed in FIG. 2B.
e. After all of the above distributions have been made, each individual member of the VP list is sent to the main procedure for identifying arguments (43). Then the next member of the list of VPs is processed (44). When the list is empty, the procedure terminates.

Figure 2K:
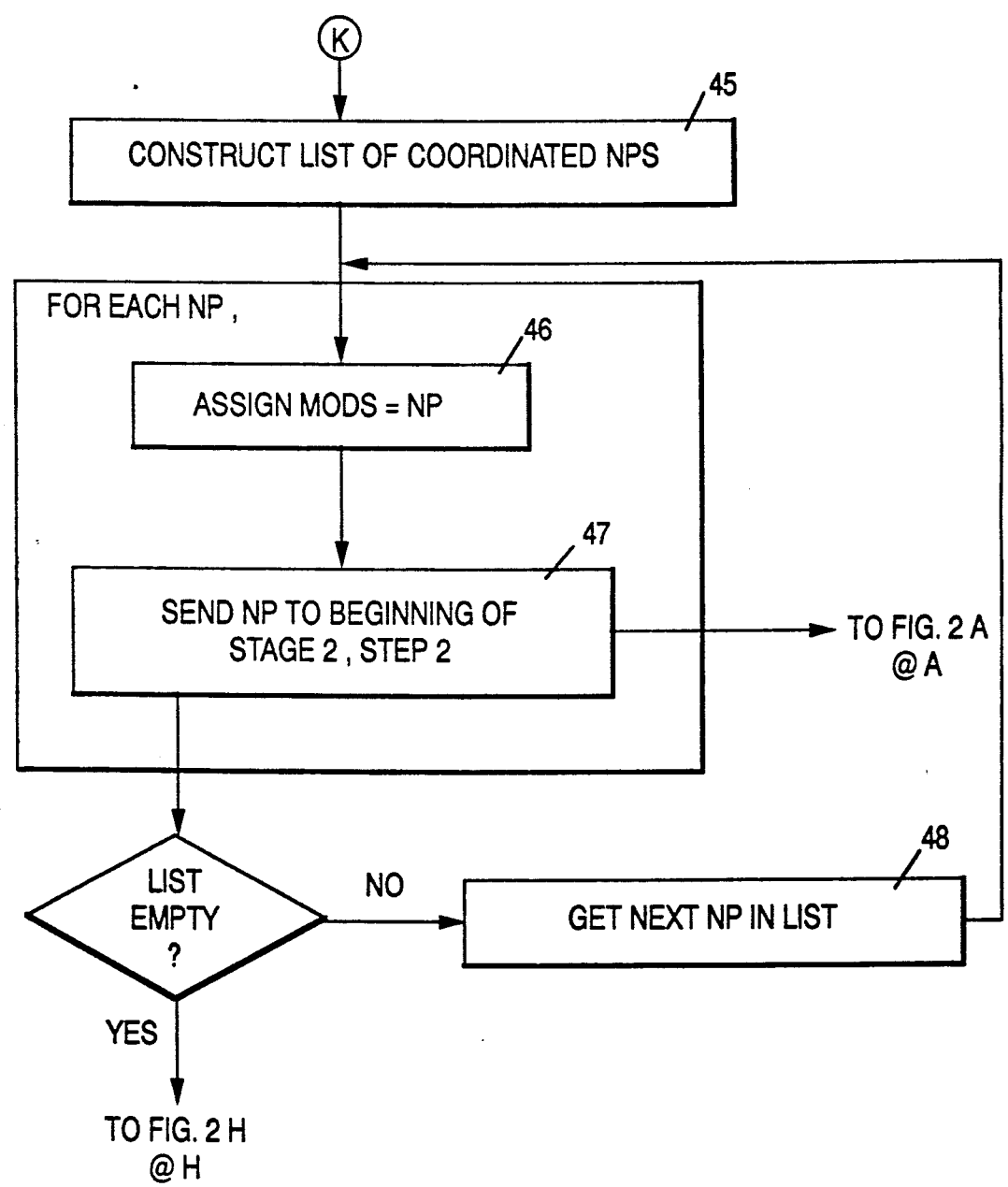
FIG. 2K is the portion of the flow diagram which processes coordinated noun phrases.

FIG. 2K illustrates the process of separating coordinated noun phrases. This procedure is called from the procedure that handles NP modifiers (see FIG. 2G). First a list is constructed of all NPs that are within the larger coordinated NP (45). Then, for each member of that list of NPs,
a. A MODS attribute is created on the parent NP, with its value being a pointer to the NP member of the list (46). This results in having all coordinated NPs listed as MODS under their parent NP.
b. After each individual member of the NP list has been so assigned, it is sent to the main procedure for identifying arguments (47). Then the next member of the list of NPs is processed (48). When the list is empty, the procedure terminates.

FIG. 3 displays two structural stages that occur in the processing of a sentence with a long-distance dependency: "Alice, Peter said that John kissed." First is the syntactic structure, presented in abbreviated form as a parse tree (49). The tree is produced by using only a few of the attributes and values that actually exist in the record structure after PEG has processed this input string. In this parse tree, "Alice" is displaced from the verb "kissed"; and there is no indication of any meaningful relationship between those two words.

Second is the basic semantic structure, the argument structure, presented in abbreviated form as a kind of chart (50). This chart is produced by using only the semantic attributes that have been disclosed in this invention, and by indenting them to group the arguments properly with their verbs. In this argument structure, "Alice" is correctly linked as the DOBJECT of the verb "kissed."

The record structure which is output can be used by machine translation devices to provide more accurate translations of one natural language into another. The output can also be applied to advanced text critiquing, improved information retrieval, electronic mail routing and filing, automatic text generation, and any other NLP applications that require a basic semantic analysis.

The invention is embodied as a computer program running on a data processing system such as that disclosed in U.S. Pat. No. 4,731,735 to Borgendale, et al., cited above and incorporated herein by reference. The program embodying the invention is stored in the memory in the system and is executed by the execution unit. The string of natural language words can be input to the execution unit from the keyboard, from the bulk storage, from the connected terminals or from the communications link. The syntactic parsing stage and the semantic analysis stage of the invention are executed by the program embodiment of the invention in the data processing system. The semantic attribute record structure output by the program embodiment of the invention can be output to the display, to the printer, to the bulk storage, to the communications link or to another partition in the memory, as a semantic characterization of the input string which can be immediately displayed to the user on the display screen, or which can be input to utilization processes or programs running on the same data processing system or on other data processing systems.

Although a specific embodiment of the invention has been disclosed, it will be understood by those having skill in the art that changes can be made to that specific embodiment without departing from the spirit and scope of the invention.

What is claimed is:

1. In a computer method for determining basic semantic structures for natural language word strings, including inputting a string consisting of a plurality of words forming a linguistic expression in a natural language and parsing the input string with a syntactic set of rules to derive a syntactic structure for the string, identifying syntactic arguments for said words, the method comprising the steps of:

identifying a first group of words in said string as semantic arguments, when said semantic arguments correspond exactly to said syntactic arguments;

identifying semantic arguments in a second group of words in said string, which are not in said first group, by the following steps:

assigning missing arguments of infinitive clauses and participle clauses;

assigning long distance arguments;

assigning missing or displaced arguments in passive constructions;

assigning arguments for indirect object construction;

linking predicate adjectives to their subject noun phrases;

linking verb phrase modifiers to their verbs;

linking noun phrase modifiers to their nouns;

linking adjective phrase modifiers to their adjectives;

linking adverb phrase modifiers to their adverbs;

outputting said assigned arguments in a record which provides a normalized semantic structure for said input word string.

2. A computer method for determining semantic structures according to claim 1, wherein said normalized semantic structure is achieved by adding new attributes and values having semantic significance, to said syntactic structure.

* * * * *